United States Patent [19]
Moore et al.

[11] Patent Number: 5,954,085
[45] Date of Patent: Sep. 21, 1999

[54] PREFABRICATED MODULAR FUEL DISPENSING SYSTEM

[75] Inventors: Bobby L. Moore, Mulberry; Arthur A. Sabatinelli, Coral Springs, both of Fla.

[73] Assignee: Petro-First, Inc., Pompano Beach, Fla.

[21] Appl. No.: 08/664,532

[22] Filed: Jun. 17, 1996

Related U.S. Application Data

[63] Continuation of application No. 08/273,982, Jul. 12, 1994, Pat. No. 5,526,964.

[51] Int. Cl.⁶ .................................. B60S 5/02; E04H 1/12
[52] U.S. Cl. ...................... 137/234.6; 137/376; 52/126.6; 222/383.2
[58] Field of Search ............................... 137/234.6, 376; 52/126.1, 126.5, 126.6; 222/383.1

[56] References Cited

U.S. PATENT DOCUMENTS

| | | | |
|---|---|---|---|
| 1,867,892 | 7/1932 | Rice | 137/376 X |
| 2,182,126 | 12/1939 | Hogarth | 221/95 |
| 2,959,826 | 11/1960 | Larsen et al. | 137/234.6 X |
| 3,076,205 | 2/1963 | Schultz | 114/256 |
| 3,777,774 | 12/1973 | Martin | 137/234.6 |
| 4,558,544 | 12/1985 | Albrecht et al. | 52/126.6 |
| 4,901,748 | 2/1990 | Shotmeyer | 137/234.6 |
| 4,926,899 | 5/1990 | Argandona | 137/234.6 |
| 4,988,020 | 1/1991 | Webb | 222/608 |
| 4,989,634 | 2/1991 | Rieseck | 137/363 |
| 5,056,750 | 10/1991 | Ellithorpe | 248/354.3 |
| 5,390,713 | 2/1995 | Fiech | 141/98 |
| 5,526,964 | 6/1996 | Moore et al. | 137/234.6 X |
| 5,586,586 | 12/1996 | Fiech | 141/98 |

FOREIGN PATENT DOCUMENTS

94/20341 9/1994 WIPO.

*Primary Examiner*—John Rivell
*Attorney, Agent, or Firm*—Wenderoth, Lind & Ponack, L.L.P.

[57] ABSTRACT

A fuel dispensing system comprising a foundation module including an underground fuel reservoir to store fuel to be dispensed and a conduit containment trough to house a fuel supply conduit and fuel dispensing conduit therein, a fuel dispensing module including a pump island to support a fuel dispensing device thereon and a canopy module held in fixed spaced relationship above the fuel dispensing module.

32 Claims, 5 Drawing Sheets

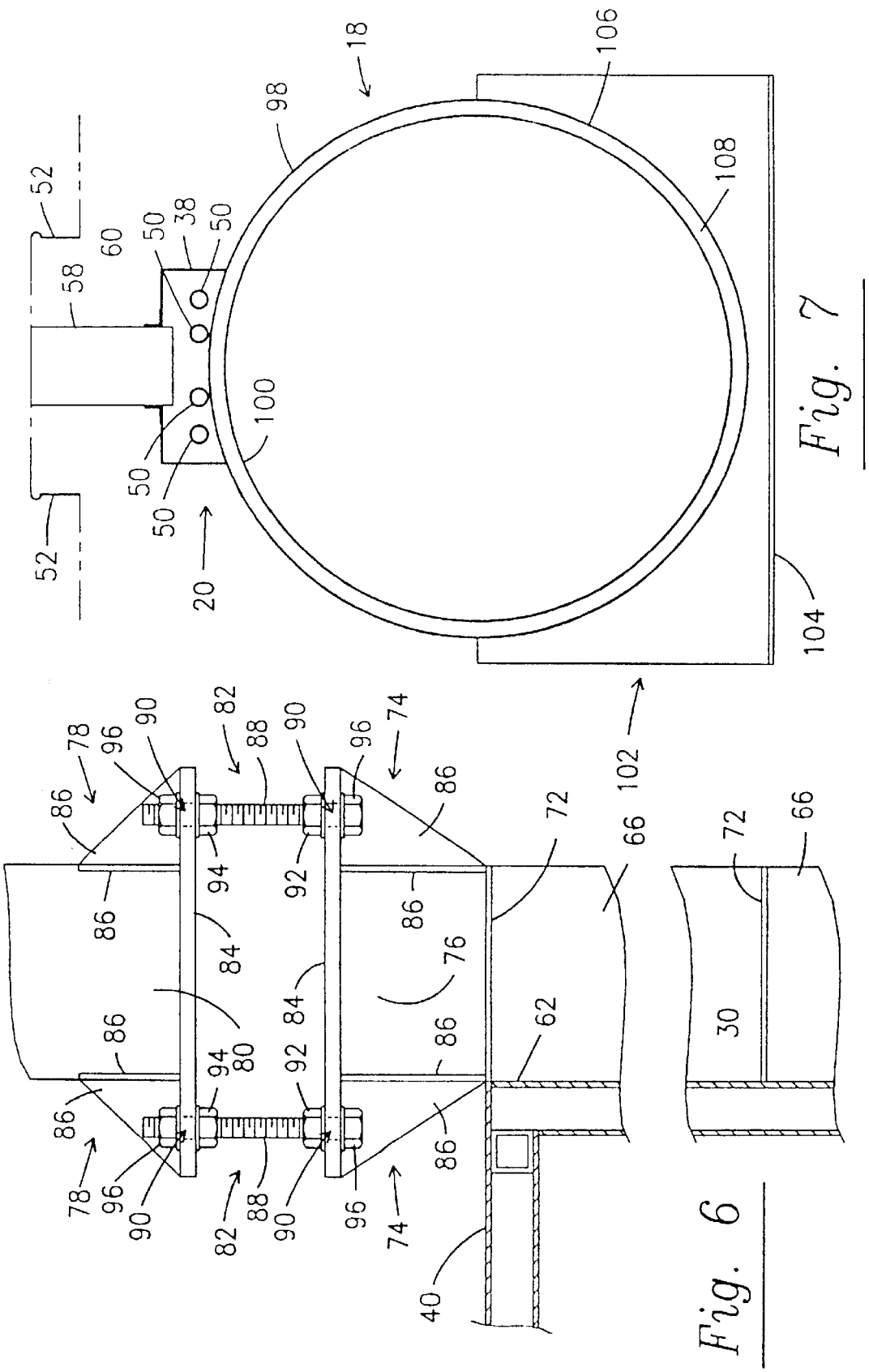

PREFABRICATED MODULAR FUEL DISPENSING SYSTEM

This is a continuation application for allowed pending application Ser. No. 08/273,982 filed Jul. 12, 1994 now U.S. Pat. No. 5,526,964.

BACKGROUND OF THE DISCLOSURE

1 Field of the Invention

A prefabricated modular fuel dispensing system comprising a foundation module including an underground fuel reservoir, a fuel dispensing module including a pump island and a canopy module including an upper canopy member held in fixed spaced relationship above the fuel dispensing module configured to be integrated into a unitized, mutually supportive structure.

2 Description of the Prior Art

Commonly, gasoline pumps are mounted on an island and connected to gasoline tanks located at a distance. This is inconvenient and requires elaborate piping arrangements with other disadvantages.

U.S. Pat. No. 2,959,826 describes a gasoline station in which pumps are arranged on an island with the gasoline reservoir disposed immediately beneath the island. The gasoline reservoir is preferably divided into a plurality of compartments imbedded in the ground having a layer of cement poured on top thereof. The gasoline pumping means, preferably a plurality of pumps one for each compartment, is, in turn, mounted on the platform. The platform is arranged so there is an adjustable space between the top of the tank or the cement layer covering the tank and the deck of the platform. This space accommodates the filling means.

U.S. Pat. No. 3,777,774 shows a gas bar including a prefabricated kiosk secured to a foundation anchored within the ground and extending slightly above the level of the ground. A post is provided which is anchored in the foundation centrally within the kiosk which extends upwardly through the roof of the kiosk. At least two planetary services islands are disposed radially from the center of the kiosk. The service island includes a foundation securely anchored within the ground that extends above the ground and at least one gasoline dispensing pump thereon. An arched, cantilevered light fixture arm is provided for each service island.

U.S. Pat. No. 4,988,020 teaches a portable fueling facility for aircraft or ground vehicles including at least one storage tank having an outer tank as secondary containment and at least one pump for dispensing fuel. A number of saddle members support the outer tank on a flat horizontal surface. A deck compartment is provided beneath the pump as secondary containment about the supply pipes used to supply the pump and the refueling tubes used to refuel the storage tank.

U.S. Pat. No. 3,076,205 describes a floating marine fuel supply terminal comprising a compartmented cylindrical hull having a service deck thereon and three concentrically disposed liquid tight storage tanks thereunder consisting of an outer ballast water tank, an intermediate gasoline tank and an inner diesel fuel tank. The outer tank is adapted to hold ballast water in an amount approximate equal to the combined weights of the gasoline and diesel fuel to be stored in the other tanks. The diesel fuel tank has a hollow axial core portion which defines an interior recess under said deck and above a preselected water line. A first pump is mounted on the deck having an intake line extending to the bottom of the ballast water tank and further extending externally of the hull below the water line and a discharge line extending into the ballast water tank. A second pump is mounted on the deck having an intake line extending to the bottom of the ballast water tank and a discharge line extending externally of the hull immediately above the water line. A superstructure is provided on the deck for housing personnel and equipment of the type associated with marine refueling services and for carrying such equipment as is required by the coast guard and other marine authorities.

U.S. Pat. No. 2,182,126 teaches a filling station for supplying automobiles with fuel and compressed air comprising a substantially horizontal housing located at ground level, a pair of upright reservoir housings of substantially equal weight supported on the horizontal housing with fuel reservoirs, a compressed air tank located under the horizontal housing supporting same. A foundation footing disposed beneath the compressed air tank supports the compressed air tank; while, a central upright housing located substantially in line with the air tank is supported thereby. The filling station further includes a liquid fuel reservoir, a pump in the central housing for filling the reservoir, and an air compressor mounted in the central housing for supplying compressed air to the air tank.

SUMMARY OF THE INVENTION

The present invention relates to a prefabricated modular fuel dispensing system comprising a foundation module including an underground fuel reservoir to store fuel to be dispensed, a fuel dispensing module including a pump island to operatively support a plurality of fuel dispensing devices thereon coupled to the underground fuel reservoir to receive fuel therefrom and a canopy module including an upper canopy member held in fixed spaced relationship above the fuel dispensing module. The foundation module, fuel dispensing module and canopy module are configured to be integrated into a unitized, mutually supportive structure.

More specifically, the underground fuel reservoir includes a plurality of separate fuel storage compartments to store a corresponding plurality of fuels to be dispensed therefrom. A conduit containment trough is attached to the underground fuel reservoir to operatively house a corresponding plurality of fuel supply conduits to feed fuel from an external source to the underground fuel reservoir and a corresponding plurality of fuel dispensing conduits from the underground fuel reservoir to the fuel dispensing devices to selectively receive fuel from the underground fuel reservoir thereof the plurality of fuel dispensing conduits.

The upper canopy member is held in fixed spaced relationship above the fuel dispensing module by a plurality of substantially vertical canopy support columns secured to the underground fuel reservoir. Each of the plurality of substantially vertical canopy support columns comprises a lower column member affixed to the underground fuel reservoir and a corresponding upper column member coupled to the corresponding lower column member by a canopy leveling means coupled to the lower end of the corresponding upper column member of and affixed to the canopy module at the upper end of the corresponding upper column member. Each of the lower column members are anchored or secured to the underground fuel reservoir by a stabilizing means.

To install, with the underground fuel reservoir placed in the ground, the underground fuel reservoir and the conduit containment trough are covered. The pump island is formed once the underground fuel reservoir is buried. With the lower column members affixed and stabilized to opposite ends of the underground fuel reservoir and extending above ground, the corresponding upper column members are affixed thereto and leveled. The upper canopy member is affixed to the upper end portions of the upper column members.

When so installed and assembled, the underground fuel reservoir provides stabilization and support for the fuel dispensing module and canopy module.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which:

FIG. 6 is a partial detailed side view of the substantially vertical canopy support column and canopy leveling means.

FIG. 7 is a partial cross-sectional end view of an alternate embodiment of the underground fuel reservoir.

Similar reference characters refer to similar parts throughout the several views of the drawings.

DETAILED DESCRIPTION OF THE PREFERRED EMBODIMENT

Figure 1:
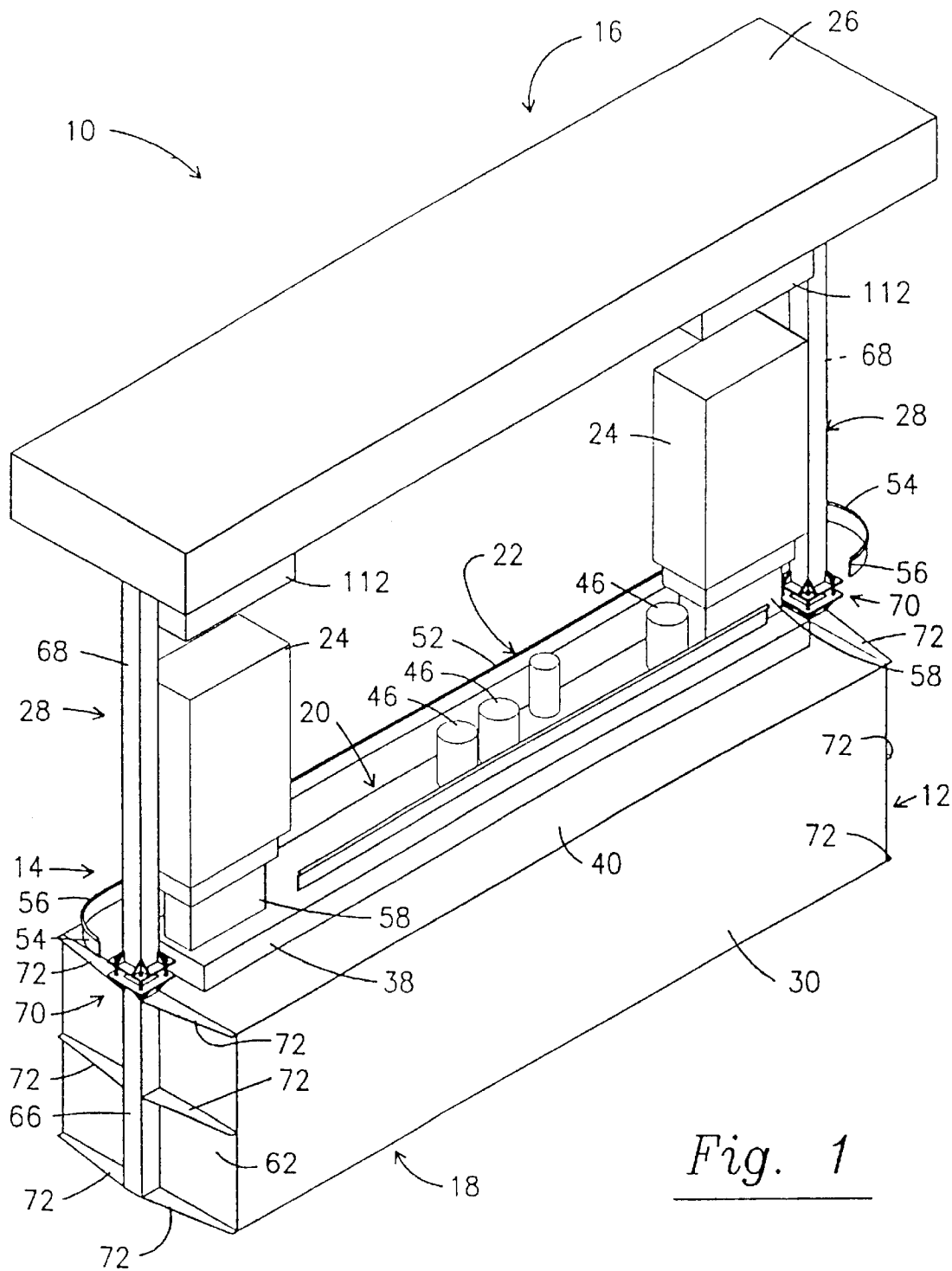
FIG. 1 is a perspective view of the prefabricated modular fuel dispensing system.
Figure 3:
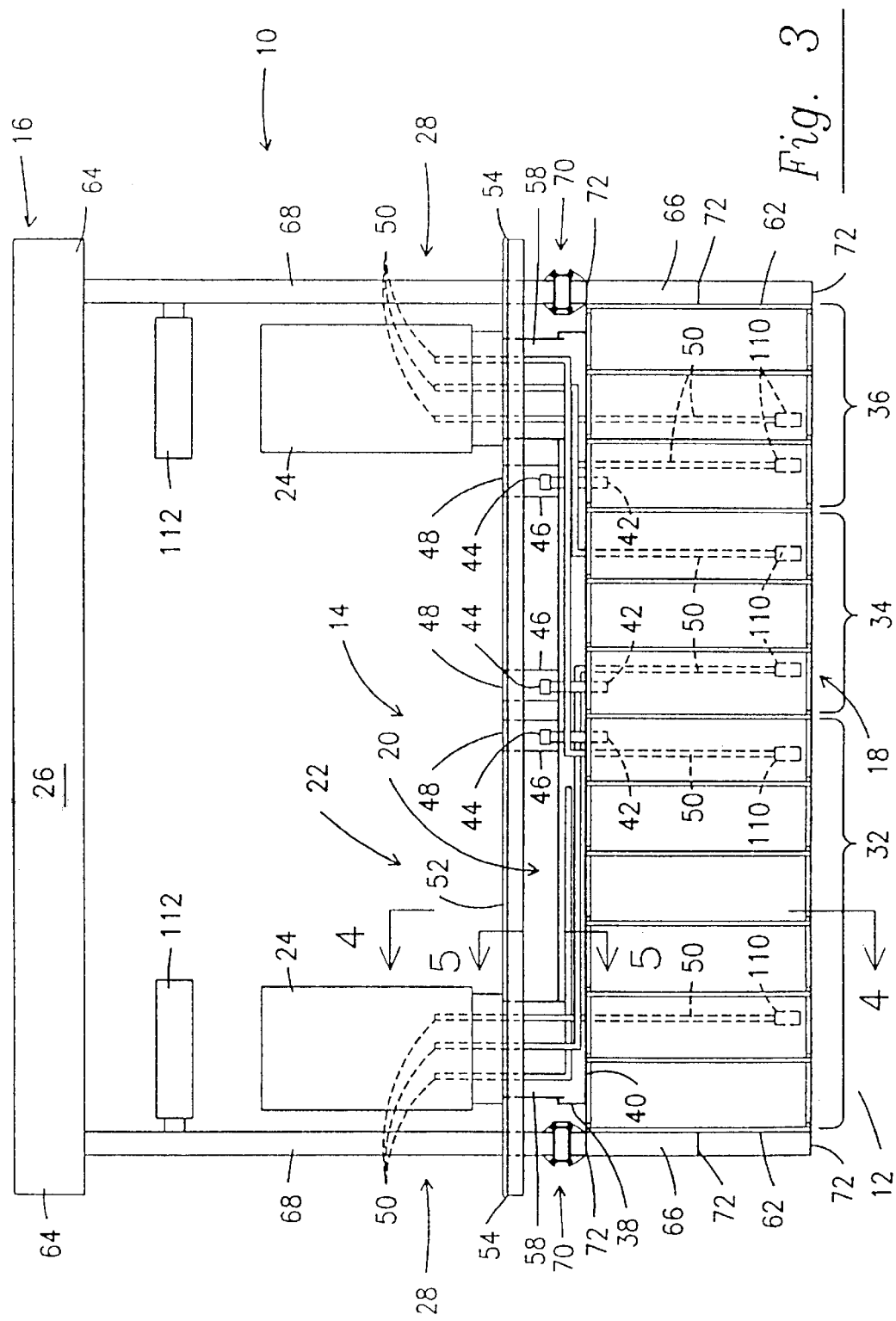
FIG. 3 is a side view of the prefabricated modular fuel dispensing system.

As best shown in FIGS. 1 and 3, the present invention relates to a prefabricated modular fuel dispensing system generally indicated as 10 comprising a foundation module generally indicated as 12, a fuel dispensing module generally indicated as 14 and a canopy module generally indicated as 16 configured to be assembled into an integrated, unitary mutually supportive structure. As described more fully hereinafter, the foundation module 12 comprises an underground fuel reservoir generally indicated as 18 to store fuel to be dispensed therein and a conduit containment trough generally indicated as 20 attached to the underground fuel reservoir 18 to operatively house a plurality of fuel supply conduits and a plurality of fuel dispensing conduits therein; while, the fuel dispensing module 14 comprises a raised pump island generally indicated as 22 to operatively support a plurality of fuel dispensing devices each indicated as 24 and the canopy module 16 comprises an upper canopy member 26 held in fixed spaced relationship above the fuel dispensing module 14 by a plurality of substantially vertical canopy support columns each generally indicated as 28 secured to foundation module 12.

Figure 2:
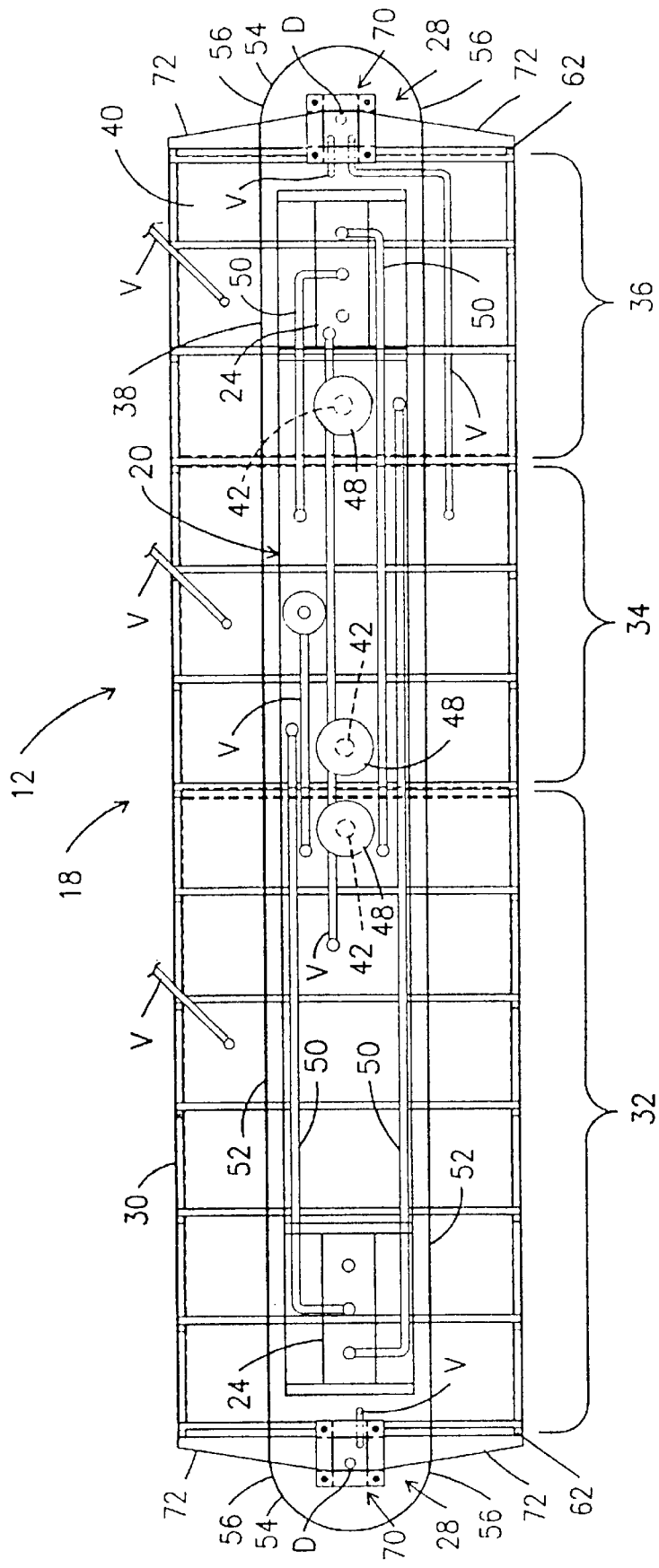
FIG. 2 is a top view of the prefabricated modular fuel dispensing system.

As best shown in FIGS. 1 through 3, the underground fuel reservoir 18 comprises a double wall rectilinear tank 30 including a first, second and third fuel compartment indicated as 32, 34 and 36 respectively to store different fuels to be selectively fed to each of the fuel dispensing devices 24 as described more fully hereinafter.

As best shown in FIGS. 2 through 5, the conduit containment trough 20 comprises a conduit housing 38 mounted to the top wall 40 of the double wall rectilinear tank 30.

The conduit containment trough 20 upwardly extends from the fuel reservoir 18 so as to peripherally enclose a longitudinal space above the reservoir.

Each of the plurality of fuel supply conduits comprises a substantially vertical pipe 42 in fluid communication with corresponding first, second and third fuel compartments 32, 34 and 36. The upper end of each of the substantially vertical pipes 42 is covered with a corresponding cap 44. Moreover, each substantially vertical pipe 42 is disposed within a pipe housing 46 extending through pump island 22 and capped with a corresponding cover 48. Each of the plurality of fuel dispensing conduits comprises a fuel hose 50 extending between corresponding first, second and third fuel compartments 32, 34 and 36 and each of the fuel dispensing devices 24. As best shown in FIG. 2, the underground fuel reservoir 18 includes a vent system and drain system with the various components indicated as V and D respectively.

Figure 4:
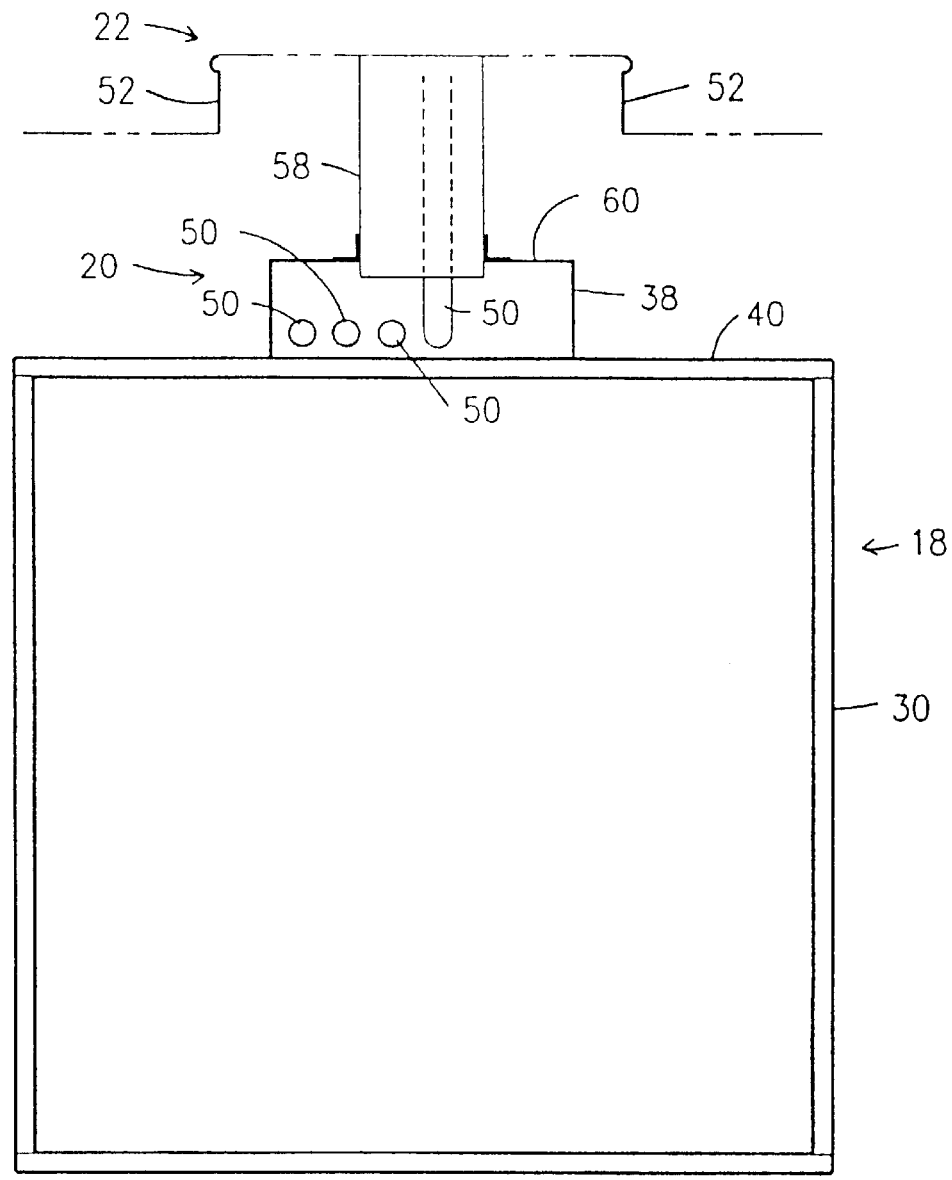
FIG. 4 is a partial cross-sectional end view of the prefabricated modular fuel dispensing system taken along lines 4—4 of FIG. 3.
Figure 5:
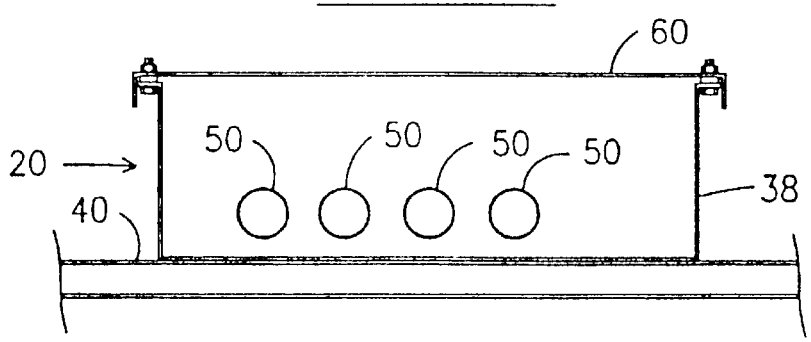
FIG. 5 is a partial cross-sectional end view of the prefabricated modular fuel dispensing system taken along lines 5—5 of FIG. 3.

As best shown in FIGS. 1 through 3, the raised pump island 22 comprises a form including a pair of substantially parallel elongated side members each indicated as 52 and a pair of arcuate end members each indicated as 54 extending between adjacent ends of the pair of substantially parallel elongated side members each indicated as 56. The form extends around the substantially vertical canopy support column 28 to receive concrete or the like to create the raised pump island 22 over the foundation module 12 to operatively support the fuel dispensing devices 24. As best shown in FIGS. 1, 3 and 4, a hollow riser 58 extends vertically from the top 60 of the conduit housing 38 to the bottom of each of the fuel dispensing devices 24 to house the fuel hoses 50 coupled between the first, second and third fuel compartments 32, 34, and 36 and each of the fuel dispensing devices 24.

As best shown in FIGS. 1 through 3, each of the substantially vertical canopy support columns 28 extends upwardly from opposite ends 62 of the double wall rectilinear tank 30 to support opposite end portions 64 of the upper canopy member 26. As best shown in FIGS. 1 and 3, each of the substantially vertical canopy support columns 28 comprises a lower column member 66 coupled to an upper column member 68 by a canopy leveling means generally indicated as 70. As best shown in FIG. 1, the lower column member 66 is affixed to the opposite ends 62 of the double wall rectilinear tank 30 by a stabilizing means comprising a plurality of sets of gussets or retainer plates each indicated as 72 disposed in pairs on opposite sides of the lower column member 66 and spaced vertically along the lower column member 66.

As best shown in FIG. 6, the canopy leveling means 70 comprises a lower coupling member generally indicated as 74 affixed to the upper end 76 of the lower column member 66 and an upper coupling member generally indicated as 78 affixed to the lower end 80 of the upper column member 68 coupled together by a plurality of leveling members each generally indicated as 82. The lower coupling member 74 and the upper coupling member 78 each comprises a substantially flat base 84 affixed to the upper end 76 of the lower column member 66 and the lower end 80 of the upper column member 68 respectively. A plurality of side support members each indicated as 86 extend between the substantially flat bases 84 and the upper end 76 and lower end 80.

Each leveling member 82 comprises a rigid elongated externally threaded element 88 extending through a corresponding pair of aligned apertures 90 formed through the substantially flat bases 84 of the lower coupling member 74 and the upper coupling member 78. The distance or space between the substantially flat bases 84 and the relative parallel alignment therebetween are controlled by the distance between corresponding lower and upper adjustment means or nuts indicated as 92 and 94 respectively longitudinally movably or adjustably mounted on opposite ends of each of the rigid elongated externally threaded element 88. Each of the rigid elongated externally threaded elements 88 is secured to the substantially flat base 84 of the lower coupling member 74 and the upper coupling member 78 by a fastening means or nut 96 secured to the rigid elongated externally threaded element 88 on the side of the substantially flat bases 84 of the lower coupling member 74 and the upper coupling member 78 opposite the lower adjustment means 92 and upper adjustment means 94 respectively.

FIG. 7 shows an alternate embodiment of the underground fuel reservoir 18. In particular, the underground fuel reservoir 18 comprises a substantially cylindrical tank 98 having the conduit containment trough 20 affixed to the top 100 thereof in alignment with the first, second or third fuel compartments 32, 34 and 36 and the various access apertures for the substantially vertical pipes 42, pipe housings 46 and fuel hose 50 formed therethrough and the risers 58. The substantially cylindrical tank 98 is supported in the ground by a plurality of vertically disposed cradles or tank supports generally indicated as 102. Each cradle or tank support 102 comprises a rectilinear outer periphery 104 to rest on a flat underground surface and an arcuate or concave inner periphery 106 to engage and support the bottom surface 108 of the substantially cylindrical tank 98.

To install, with the underground fuel reservoir 18 placed and leveled in the ground, the underground fuel reservoir 18 and the conduit containment trough 20 are covered. The raised pump island 22 is formed once the underground fuel reservoir 18 is buried. With each of the lower column members 66 affixed and stabilized to opposite ends 62 of the underground fuel reservoir 18 and extending above ground, the corresponding upper column members 68 are affixed thereto and leveled or adjusted by the canopy leveling means 70. The upper canopy member 26 is affixed to the upper end portions of the upper column members 68.

When so installed and assembled, the underground fuel reservoir 18 provides stabilization and support for the fuel dispensing module 14 and canopy module 16.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. A fuel tank assembly for a fuel dispensing system, comprising:
   a fuel reservoir having at least one fuel storage compartment therein,
   a conduit containment trough upwardly extending from said fuel reservoir,
   said conduit containment trough peripherally enclosing a space above said fuel reservoir and operatively housing conduit means, and
   said conduit means arranged to conduct fuel from said fuel reservoir to a fuel dispensing system.

2. The fuel tank assembly as claimed in claim 1, wherein said conduit containment trough includes an upper cover.

3. The fuel tank assembly as claimed in claim 1, wherein said conduit containment trough is mounted to a top wall of said fuel reservoir.

4. The fuel tank assembly as claimed in claim 1, wherein said conduit containment trough houses a plurality of fuel supply conduits.

5. The fuel tank assembly as claimed in claim 1, further comprising a hollow riser extending vertically from said conduit containment trough for connection to a fuel dispensing device.

6. The fuel tank assembly as claimed in claim 1, further comprising at least one support structure extending from said fuel reservoir.

7. The fuel tank assembly as claimed in claim 6, wherein said at least one support structure comprises a first support structure and a second support structure, said first and second support structures extending from said fuel reservoir.

8. The fuel tank assembly as claimed in claim 7, wherein each of said first and second support structures is secured to said fuel reservoir by a stabilizing means.

9. The fuel tank assembly as claimed in claim 7, wherein each of said first and second support structures is secured to said fuel reservoir by an attachment means.

10. The fuel tank assembly as claimed in claim 7, wherein said first support structure is secured to said first side of said fuel reservoir by a plurality of gussets disposed on opposite sides of said first support structure, and
    said second support structure is secured to said second side of said fuel reservoir by a plurality of gussets disposed on opposite sides of said second support structure.

11. The fuel tank assembly as claimed in claim 1, wherein said fuel reservoir comprises a cylindrical tank.

12. The fuel tank assembly as claimed in claim 1, wherein said fuel reservoir comprises a rectilinear tank.

13. The fuel tank assembly as claimed in claim 1, wherein said peripherally enclosed space is longitudinal.

14. A fuel dispensing system, comprising:
    a fuel tank assembly for a fuel dispensing system, comprising a fuel reservoir having at least one fuel storage-compartment therein, a conduit containment trough upwardly extending from said fuel reservoir, said conduit containment trough peripherally enclosing a space above said fuel reservoir and operatively housing conduit means, and said conduit means arranged to conduct fuel from said fuel reservoir to a fuel dispensing system; and
    at least one fuel dispensing device in fluid communication with said at least one fuel storage-compartment.

15. The fuel dispensing system as claimed in claim 14, wherein said conduit containment trough includes an upper cover.

16. The fuel dispensing system as claimed in claim 14, wherein said conduit containment trough is mounted to a top wall of said fuel reservoir.

17. The fuel dispensing system as claimed in claim 14, wherein said conduit containment trough houses a plurality of fuel supply conduits.

18. The fuel dispensing system as claimed in claim 14, further comprising a hollow riser extending vertically from said conduit containment trough for connection to said fuel dispensing device.

19. The fuel dispensing system as claimed in claim 14, further comprising at least one support structure extending from said fuel reservoir.

20. The fuel dispensing system as claimed in claim 19, wherein said at least one support structure comprises a first support structure and a second support structure, said first and second support structures extending from said fuel reservoir.

21. The fuel dispensing system as claimed in claim 20, wherein each of said first and second support structures is secured to said fuel reservoir by a stabilizing means.

22. The fuel dispensing system as claimed in claim 20, wherein each of said first and second support structures is secured to said fuel reservoir by an attachment means.

23. The fuel dispensing system as claimed in claim 20, wherein said first support structure is secured to a first side of said fuel reservoir by a plurality of gussets disposed on opposite sides of said first support structure, and said second support structure is secured to a second side of said fuel reservoir by a plurality of gussets disposed on opposite sides of said second support structure.

24. The fuel dispensing system as claimed in claim 14, wherein said fuel reservoir comprises a cylindrical tank.

25. The fuel dispensing system as claimed in claim 14, wherein said fuel reservoir comprises a rectilinear tank.

26. The fuel dispensing system as claimed in claim 19, further comprising at least one canopy support structure connected to said at least one support structure.

27. The fuel dispensing system as claimed in claim 26, further comprising a canopy supported on said at least one canopy support structure.

28. The fuel dispensing system as claimed in claim 14, further comprising:

a first and second support structure secured to said fuel reservoir;

a first canopy support structure having an upper end and a lower end, said lower end being secured to said first support structure;

a second canopy support structure having an upper end and a lower end, said lower end being secured to said second support structure; and a canopy supported on said first and second canopy support structures.

29. The fuel dispensing system as claimed in claim 28, wherein said upper end of said first support structure is secured to said lower end of said first canopy support structure by a first leveling connector, and said upper end of said second support structure is secured to said lower end of said second canopy support structure by a second leveling connector.

30. The fuel dispensing system as claimed in claim 29, wherein each of said first and second leveling connectors comprises:

a lower coupling member;

an upper coupling member; and a plurality of leveling fasteners coupling together said upper and lower coupling members.

31. The fuel dispensing system as claimed in claim 14, further comprising a raised pump island form surrounding said at least one fuel dispenser and defining a perimeter and height of a raised pump island, said pump island form including:

a pair of substantially parallel elongated side members; and a pair of arcuate end members connecting adjacent ends of said pair of substantially parallel elongated side members, respectively.

32. The fuel dispensing system as claimed in claim 14, wherein said peripherally enclosed space is longitudinal.

* * * * *